United States Patent
Blot et al.

(10) Patent No.: US 7,227,099 B2
(45) Date of Patent: Jun. 5, 2007

(54) SYSTEM AND METHOD FOR IMPROVING THE PRODUCTIVITY OF A WELDING SHOP

(75) Inventors: Roger Blot, Le Vesinet (FR); Serban Cantacuzene, Massy (FR); Eric Cazottes, Ecouen (FR); Stephane Cosson, La Marne (FR); Jean-François Lecouffe, Paris (FR); Viwek Vaidya, Montreal (CA)

(73) Assignee: L'Air Liquide Societe Anonyme a Directoire et Conseil de Surveillance pour l'Etude et, l'Exploitation des Procedes Georges, Claude, Paris Cedex (FR)

( * ) Notice: Subject to any disclaimer, the term of this patent is extended or adjusted under 35 U.S.C. 154(b) by 73 days.

(21) Appl. No.: 10/630,241

(22) Filed: Jul. 30, 2003

(65) Prior Publication Data

US 2005/0072769 A1   Apr. 7, 2005

(30) Foreign Application Priority Data

Aug. 5, 2002   (FR)   .................................. 02 09935

(51) Int. Cl.
*B23K 9/095* (2006.01)

(52) U.S. Cl. ............................. 219/130.01; 219/137 PS

(58) Field of Classification Search ........... 219/130.01, 219/137 PS, 130.21, 130.31, 130.32, 130.33; 228/103

See application file for complete search history.

(56) References Cited

U.S. PATENT DOCUMENTS

| | | | | |
|---|---|---|---|---|
| 3,725,637 A | * | 4/1973 | Wenrich et al. | 219/130.01 |
| 4,518,844 A | | 5/1985 | Needham | |
| 6,051,805 A | * | 4/2000 | Vaidya et al. | 219/130.01 |
| 6,236,017 B1 | * | 5/2001 | Smartt et al. | 219/130.01 |
| 6,795,778 B2 | * | 9/2004 | Dodge et al. | 228/103 |

FOREIGN PATENT DOCUMENTS

| | | |
|---|---|---|
| EP | 0 865 858 A1 | 9/1998 |
| WO | WO 99 58285 | 11/1999 |
| WO | WO 02 058878 | 8/2002 |

OTHER PUBLICATIONS

French Search Report to FR 02 09935.

* cited by examiner

Primary Examiner—Clifford C. Shaw
(74) Attorney, Agent, or Firm—Young & Thompson

(57) ABSTRACT

Methods of controlling an arc welding shop. In the shop, several welding torches are used and each torch is supplied with consumable wire. The wire moves at a wire speed and is subjected to an electrical current. For each torch, either an average wire speed or an average electrical current, as measured over a fixed time period, is determined by a sensor. These values then allow productivity parameters to be selected for the torches. Productivity parameters include the duty factor, the deposition rate, the average duty factor, and the average deposition rate.

21 Claims, 1 Drawing Sheet

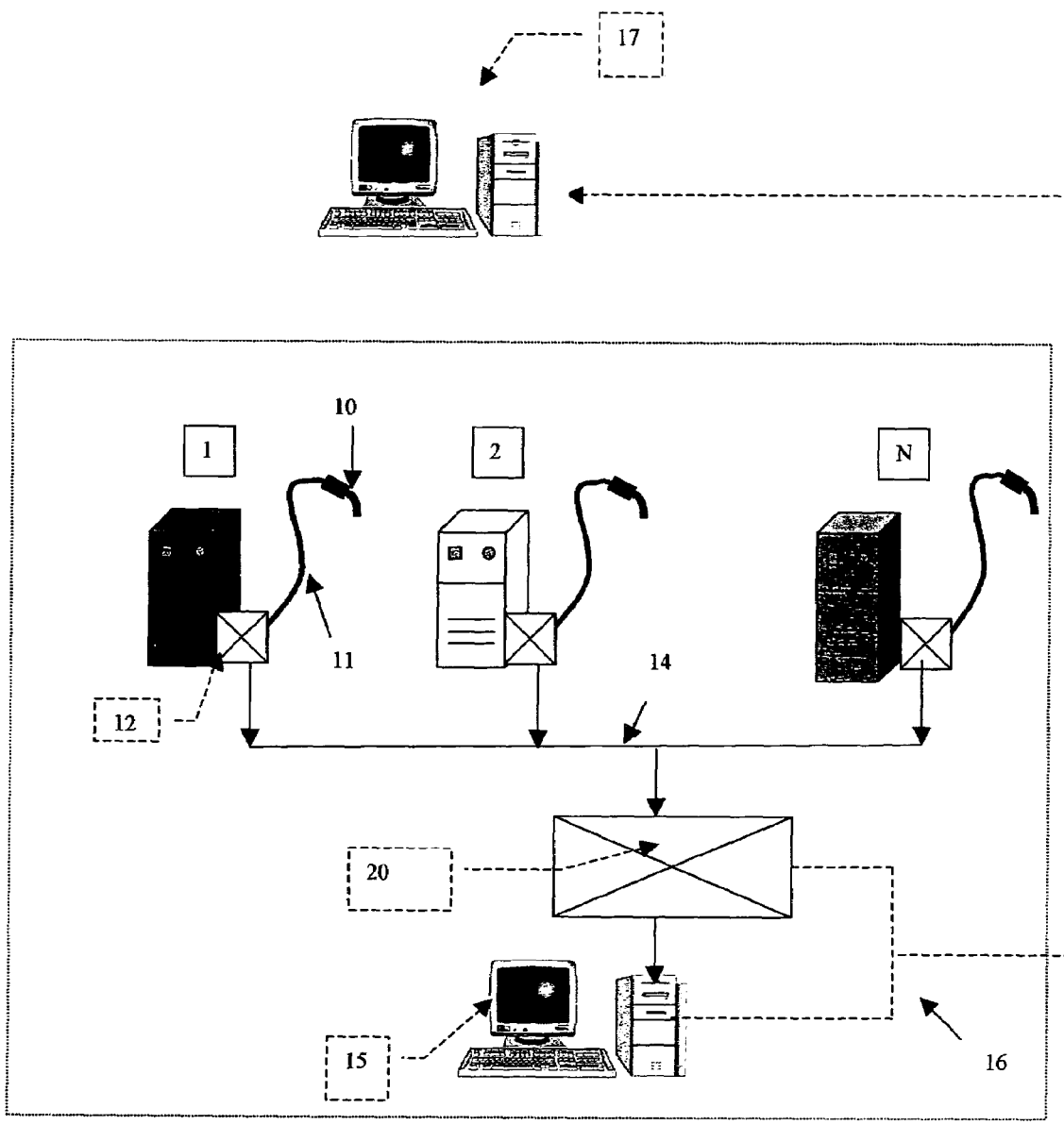

SYSTEM AND METHOD FOR IMPROVING THE PRODUCTIVITY OF A WELDING SHOP

This application claims the benefit of priority under 35 U.S.C. § 119 (a) and (b) to French Application No. 0209935, filed Aug. 5, 2002, the entire contents of which are incorporated herein by reference.

BACKGROUND

The productivity of a welding shop is a combination of several factors and may thus be expressed in several ways, especially in the form of a deposition rate, that is to say the amount of material deposited in one hour by a welder, said amount of material corresponding to the amount of consumable wire used to produce the welded joint.

Current, wire speed, welding speed or shop efficiency parameters are all related to the efficiency of the welding.

If we consider that the size of the weld beads produced meets the specifications, then by increasing the wire speed, and therefore the current for the process, the rate of displacement of the arc is increased, which therefore means a longer weld bead deposited per unit time.

Likewise, any increase in the level of utilization of the shop or in the effective time during which the arc is ignited will have a favorable impact on the deposition rate of the shop.

The efficiency of a welding shop may be improved provided that there are suitable diagnostic and monitoring tools for identifying the causes of inefficiencies, such as too low a wire speed, too low a current, too low a level of utilization of the welding machines, too short an effective arc ignition time, etc.

At the present time, lacking a suitable measurement or monitoring system, most manual welding professionals use the total manufacturing time or the number of workpieces produced, over a given time period, as parameters for producing estimates, for defining the overall scheduling of the welding shop and above all to try to improve the productivity of their welding processes.

Unfortunately, using only such parameters it is not possible to take into account the actual utilization of the welding process, the efficiency of which depends not only on the duty factor of the process, namely the ratio of the time during which the electric welding arc is ignited to the total work time, but also on optimizing the welding parameters, when the arc is in operation, such as voltage, wire speed, current, type of gas mixture used and flow rate of the shielding gas used, angle of the torch with respect to the workpiece to be welded, direction of displacement, cleanliness of the workpieces, etc.

To improve the productivity of the shop, to produce accurate estimates and to manage the scheduling of the shop, it is therefore necessary to have accurate measurable values that are directly connected to the actual welding activity.

Although at the present time product shop management software products are commercially available, it turns out that these do not make it possible for measurable and reliable data that directly reflect the welding activity to be obtained automatically.

There are also what are called "multiparameter" measurement systems that extract measurable data associated with the process (current, voltage, wire speeds, etc.) and use them for traceability and quality assurance purposes, but not for strictly speaking managing and improving a welding shop in which several torches are employed simultaneously by different operators.

In addition, these multiparameter systems necessarily employ several sensors for measuring the desired data, in particular the current, the voltage, the wire speed and the gas flow rate. However, it turns out that the cost of all these sensors and the system that uses them is usually high and therefore often dissuasive.

In short, all the systems that currently exist are too complex and/or their cost is several times greater than that acceptable from the industrial standpoint and/or give only mediocre or imperfect results.

At the present time, there are no simple and economical systems for the effective management of a welding shop in which several torches are employed simultaneously by different operators, that is to say one for making the link between a measured parameter and the management elements of the shop, namely the duty factor and/or the deposition rate.

SUMMARY

The present invention relates to a method of managing or controlling, especially remotely, an electric arc welding shop in which several welding torches are employed.

The problem that the present invention aims to solve is therefore to optimize and/or improve the productivity of a welding shop in a simple, flexible and inexpensive manner, which can also be carried out remotely, that is to say via remote maintenance and/or remote management, in particular when several torches are employed simultaneously within this shop.

In other words, the object of the present invention is to propose a simple and inexpensive system using as few sensors as possible and allowing the productivity of the welding to be measured and, preferably simultaneously, optimizing the arc parameters, such as duty factor or deposition rate.

The solution of the invention method of managing or controlling an electric arc welding shop in which several welding torches, each fed to at least one consumable wire are employed each consumable wire (11) moving with a wire speed and being subjected to an electrical current of intensity, in which:

(a) for each torch, at least one wire speed value representative of the average speed at which each wire feeds each torch over a given period is determined by means of a speed sensor or at least one intensity value of the current representative of the average current to which each wire is subjected over the given period is determined by means of a current sensor; and (b) at least one productivity parameter chosen from the duty factor DF and the deposition rate DR for each torch of the shop and/or optionally the average value of these parameters, for all the torches of the shop, is determined from at least each wire speed value or each intensity value of the electrical current obtained in step (a).

BRIEF DESCRIPTION OF THE DRAWING

For a further understanding of the nature and objects for the present invention, reference should be made to the following detailed description, taken in conjunction with the accompanying drawing, in which like elements are given the same or analogous reference numbers and wherein:

FIG. 1 illustrates a schematic representation, according to one embodiment of the current invention, of a weld shop.

Depending on the case, the method of the invention may include one or more of the following technical features:

- the shop comprises 2 to 20 welding torches fed with one or more welding wires, preferably with one or two wires;
- it includes a step of storing at least one of said parameters and/or the wire speed or the current intensity;
- it includes a step of transmitting it to at least one of said parameters and/or the wire speed or said intensity to shop monitoring means, preferably a remote transmission step;
- it includes a step of acquiring and/or of storing at least one wire speed value determined by the speed sensor or at least one current intensity value determined by the current sensor;
- it includes a step of processing the wire speed values or the intensity values before and/or after storage, preferably before storage; and
- the step of processing each wire speed value or each intensity value consists in calculating at least one productivity parameter chosen from the duty factor and the deposition rate for each torch of the shop and/or optionally the average value of these parameters for all the torches of the shop.

The invention a system for managing or controlling an electric arc welding shop in which several welding torches each fed with at least one consumable wire are employed, each consumable wire moving with a wire speed and being subjected to an electrical current of intensity, comprising:

(a) first determination means, for each torch, comprising a speed sensor for determining at least one wire speed value representative of the average speed at which each wire feeds each torch over a given period or comprising at least one current sensor for determining at least one current intensity value representative of the average current to which each wire is subjected over the given period; and (b) second determination means that cooperate with the first determination means in order to determine, from at least each speed value of the wire or each intensity value of the electrical current determined by the first determination means, at least one productivity parameter chosen from the duty factor and the deposition rate for each torch of the shop and/or optionally the average value of these parameters for all the torches of the shop.

Depending on the case, the system of the invention may include one or more of the following technical features:

- it includes storage means for storing at least one productivity parameter chosen from the duty factor and the deposition rate and/or at least one wire speed value and/or current intensity for at least one torch of the shop;
- it includes transmission means for transmitting at least one of said productivity parameters and/or the wire speed or said current to shop monitoring means; and
- it comprises acquisition and/or storage means for acquiring and/or storing at least one wire speed value determined by the speed sensor or at least one current intensity value determined by the current sensor; and/or processing means for processing the wire speed values and/or the intensity values before and/or after storage.

During a welding operation three vectors coexist, namely the arc, which is the welding energy vector, the consumable welding wire, which is the material vector (filler metal), and the gas, which is the atmosphere (gas shielding) vector.

Consequently, the time during which an arc is ignited or the duty factor may be measured in three different ways, namely:

- either by the electrical measurement of the time during which the current or the voltage are nonzero, which corresponds to the time during which the arc exists;
- or by measuring the time during which the flow rate of the gas is nonzero, which corresponds to the time when the gas is present;
- or by measuring the time during which the wire unreeling speed is nonzero, which corresponds to the time during which material is supplied.

According to a first aspect of the invention, specifically choosing the measurement of the wire unreeling speed, also called the "wire speed" or more simply "wire feed speed", makes it possible both:

- to measure the time during which the wire is being unreeled and melted by the arc, which therefore also corresponds to the time during which the arc is ignited, as otherwise the wire would not be melted and would not be unreeled, and therefore the wire feed speed would always be zero; and
- to simultaneously measure the amount of material supplied and melted, which represents, to within a few % by weight, the amount of metal deposited by the welder, also called the "deposition rate"; the deposition rate is the ignited arc productivity parameter.

Using the wire speed measurement therefore results in a measure of the optimization of the arc when it is ignited.

According to one aspect of the invention, a single current sensor is used to determine the intensity of the electrical current.

It is because it is well known that, for each type of wire, there exists an operating range that links the current intensity value (also called the "value of the current") and the wire speed value.

Consequently, measuring the wire speed or the current value leads to a very similar result once the relationship in question has been stored, it being possible to store this within a suitable program (software).

For further details, reference may be made to the document: "Les procédés de soudage à l'arc, Les Soudages TIG, MIG et MAG" [Arc welding processes: TIG, MIG and MAG welding], Air Liquide, published in May 1995, which explains the relationship between wire speed and current intensity depending on the nature of the welding wire in question and of the gas used; see in particular pages 26, 35 and 44.

The basic idea of the present invention is therefore to measure, with a single wire speed or current sensor, the productivity of the arc welding, such as MIG/MAG, through the duty factor and the deposition rate.

The wire speed or the current may be measured very easily by means of a single, commercially available, sensor located at the point of exit of the wire from the feeder in the case of the wire speed sensor or on the secondary of the generator in the case of the current sensor, respectively.

From this, knowing the amount of metal to be deposited for a given joint length to be produced, it is easy to relate this value to the measurements made of the deposition rate in order to provide an overall manufacturing time for the workpiece to be welded.

By taking these two values into consideration, namely the amount of metal to be deposited and the deposition rate, it is then possible to provide welding sets that can carry out the manufacture and their load factors, that is to say the scheduling within the welding shop, and produce realistic estimates from the manufacturing times defined.

The present invention therefore makes it possible, using a single simple wire speed or current sensor, together with a welding productivity measurement, to produce a tool for making manufacturing estimates and to produce a welding shop scheduling tool.

DESCRIPTION OF PREFERRED EMBODIMENTS

The present invention relates to a method of managing or controlling, especially remotely, an electric arc welding shop in which several welding torches are employed.

A fuller understanding of the invention will be gained from the description that follows of an example of the implementation of the invention, illustrated in FIG. 1 appended hereto, in which a wire speed sensor is used.

FIG. 1 shows a manual welding shop using N welding sets denoted 1 to N. A typical value of N is, for example, between 6 and 12, but could in certain circumstances exceed one hundred, or alternatively could be less than 6.

Each welding set 1, 2, . . . N, also called a generator, comprises a welding torch 10 fed with welding wire 11 by a wire feeder or any other wire feed means, incorporated here within each generator.

The welding current is generated and then delivered to each torch 10 by the welding generators 1, 2, . . . N which here are conventional units, such as MIG/MAG generators sold by Soudure Autogène Francaise.

The torches 10 are also fed with welding gas via gas lines carrying pure gases or mixtures of several gaseous compounds, for example gases or gas mixtures of the ARCAL™ range sold by Air Liquide.

One of the ends of the (or each) consumable wire 11 is progressively melted in the electric arc so as to deposit molten metal along the entire welded joint in the process of being produced, which molten metal solidifies, after deposition, as a welded joint at the junction between the workpieces to be joined.

A wire speed sensor 12 is placed in the path of each welding wire 11, inside or outside each generator 1 to N. Preferably, the same sensor 12 is mounted on all the sets 1 to N, independently of the type of generator, thereby making it possible to monitor the speed of the wire 11 for all the sets 1 to N of the shop.

According to one way of implementing the invention, a data processing and storage facility (not shown), for example comprising a processor, one or more RAM memories, a software product installed on an EPROM, an analog/digital converter card and a communication protocol, is provided within the sensor 12, thereby making it possible to limit the datastream to the acquisition means 20 to only useful digital values or, depending on the case, to the values averaged over a given time period. Of course, the data sampling frequency and the period over which the averaging is carried out can be parameterized.

The speed sensors 12 are connected 14, directly or indirectly, to analog or digital communication ports 20 or acquisition paths, for example via wires.

The acquisition means 20 make it possible to acquire, store and/or process all or some of the information that is sent to them by the sensors 12 or the processing/storage facilities associated with said sensors 12.

Next, the data acquired by the acquisition means 20 is then sent to and stored in a data processing unit 15, such as a central computing unit of the PC type, located for example in or near the shop.

This data processing unit 15 calculates, in real time, the duty factor DF, which is defined as the percentage time during which the arc is ignited, and the deposition rate DR, which is defined as the amount of material deposited per unit time for each of the various sets 1 to N.

The values thus obtained make it possible to follow, over the course of time, the workload of each set 1 to N and the standard deviation of the measured values, making it possible to determine the regularity of each set 1 to N.

For each type of work carried out on each set 1 to N, it is then relatively easy to define typical manufacturing profiles for the broad categories of workpieces, from knowledge of the duty factor and the deposition rate for each of the broad categories of workpieces depending on the generator used. These typical profiles, organized in the form of a library of models and constantly updated, will also be able to be used to produce future estimates.

Upon receiving any new command, the person responsible for scheduling the shop chooses a type of manufacturing model and assigns it to a work set, depending on the planned workload. In this way, the planned management of the workload of each machine in the shop may be accomplished.

Moreover, so as to allow the various sets 1 to N to be monitored or managed remotely, the data acquired by the acquisition means 20 and/or stored in the data processing unit 15 may be remotely transmitted, for example, by a communication network 16, such as the Internet network, to a central remote control device 17 where this data can be saved, analyzed, processed, etc. in order to extract, for example, trends therefrom so as to be able, for example, to activate alarms or carry out a feedback operation on the welding sets for example.

The present invention has been employed in a shop for manufacturing metal cans, within which twelve welding torches can be used simultaneously to weld the metal cans. The twelve welding torches of the shop manufactured the same type of weld bead on the same type of workpiece.

The torches used in this shop worked according to a GMAW process, the wire was LAS-6 and the shielding gas was a mixture formed from 75% Ar and 25% $CO_2$.

The average wire speed, current and welding speed values were measured on the twelve torches of the shop before and, for comparison, after implementation of the invention: the results obtained are given in Tables I and II below, respectively.

The productivity of the shop was calculated in the form of a welding speed which, for the same joint, is proportional to the deposition rate (DR).

TABLE I

Before implementation of the invention

| Work set No. | Wire speed (cm/min) | Average current (A) | Welding speed (cm/min) |
|---|---|---|---|
| 1 | 584 | 95 | 41 |
| 2 | 709 | 152 | 49 |
| 3 | 800 | 135 | 59 |
| 4 | 635 | 95 | 59 |
| 5 | 599 | 173 | 41 |
| 6 | 853 | 143 | 52 |

TABLE I-continued

Before implementation of the invention

| Work set No. | Wire speed (cm/min) | Average current (A) | Welding speed (cm/min) |
|---|---|---|---|
| 7 | 663 | 134 | 55 |
| 8 | 660 | 135 | 49 |
| 9 | 536 | 127 | 51 |
| 10 | 813 | 154 | 47 |
| 11 | 584 | 150 | 47 |
| 12 | 483 | 125 | 31 |
| Shop average | 660 | 135 | 48 |

TABLE II

After implementation of the method of the invention

| Work set No. | Wire speed (cm/min) | Average current (A) | Welding speed (cm/min) |
|---|---|---|---|
| 1 | 940 | 182 | 66 |
| 2 | 958 | 155 | 51 |
| 3 | 889 | 165 | 59 |
| 4 | 1118 | 200 | 72 |
| 5 | 889 | 165 | 60 |
| 6 | 871 | 162 | 73 |
| 7 | 953 | 175 | 55 |
| 8 | 838 | 157 | 73 |
| 9 | 907 | 160 | 74 |
| 10 | 826 | 165 | 74 |
| 11 | 927 | 180 | 94 |
| 12 | 986 | 170 | 68 |
| Shop average | 925 | 170 | 68 |

Tables I and II clearly show that the method of the invention has made it possible to reduce the dispersion in the adjustment used by welders, to increase the wire speed by 40% and to increase the welding efficiency by more than 41% (expressed as the length of bead deposited per unit time).

The present invention therefore results in an appreciable improvement in the productivity of the shop thanks to better management of the torches.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used for remotely managing or controlling an electric arc welding shop utilizing at least one welding torch, said method comprising:
   a) feeding each torch at least one consumable wire;
   b) moving each consumable wire with a wire speed (V);
   c) subjecting each wire to an electrical current of intensity (I);
   d) determining, by means of a speed sensor, at least one wire speed value (V), wherein said wire speed value (V) is the average speed at which each wire feeds each torch over a given period (T);
   e) determining, by means of a current sensor, at least one current intensity value (I), wherein said current intensity value (I) is the average current which each wire is subjected to over said period (T);
   f) acquiring, by means of an of an acquisition means, at least one value of said wire speed value (V) and at least one value of said current intensity value (I);
   g) transmitting at least one of said wire speed value (V) or said current intensity value (I) to a data processing unit, wherein said data processing unit is removed from said speed sensor or said current sensor;
   h) determining, with said data processing unit, at least one productivity parameter, wherein said productivity parameter is determined from said transmitted wire speed value (V) or said transmitted current intensity value (I), and wherein said productivity parameter comprises at least one member selected from the group consisting of:
      1) duty factor (DF); and
      2) deposition rate (DR);
   i) remotely transmitting by means of a communication network, a value to a central remote control device, wherein said value comprises at least one member selected from the group consisting of
      1) said duty factor (DF);
      2) said deposition rate (DR);
      3) said wire speed value (V); and
      4) said current intensity value (I); and
   j) defining manufacturing profiles for categories of workpieces welded in the shoo based on duty factor and deposition rate for the categories of workpieces depending on a generator used in the welding:
   k) organizing the profiles in the form of a library of models for use in scheduling work in the welding shop.

2. The method according to claim 1, wherein the shop comprises from about 2 to about 20 welding torches.

3. The method according to claim 1, further comprising updating the models in the library based on duty factor and deposition rates.

4. The method according to claim 3, wherein each said torch is fed 1 or 2 wires.

5. The method according to claim 1, wherein said method further comprises storing at least one value selected from the group consisting of: wire speed value (V), current intensity value (I), duty factor (DF), and deposition rate (DR).

6. The method according to claim 1, wherein said method further comprises a step of processing at least one value selected from the group consisting of the wire speed values (V) or the intensity values (I).

7. The method according to claim 6, wherein processing each said wire speed value (V) or each said intensity value (I) consists of calculating at least one productivity parameter selected from the duty factor (DF) and the deposition rate (DR) for each torch or optionally the average value of these parameters for all the torches.

8. The method of claim 1, wherein said acquisition means is connected to said sensors by a connection means, wherein said connection means comprises at least one member selected from the group consisting of:
   a) analog communication ports;
   b) digital communication ports; and
   c) acquisition paths.

9. The method of claim 1, wherein:
   a) said data processing unit processes at least one value selected from the group consisting of said wire speed values (V) and said intensity values (I);

b) said data processing unit calculates at least one productivity parameter selected from the group consisting of said duty factor (DF) and said deposition rate (DR).

10. The method of claim 9, wherein said data processing unit is located near or in the shop.

11. The method of claim 9, wherein said data processing unit is a central computing unit.

12. The method according to claim 9, further comprising adjusting the workload of each torch over time based upon the productivity parameter.

13. The method of claim 1, further comprising extracting trends from said remotely transmitted values of said duty factor, said deposition rate (DR), said wire speed value (V), and said current intensity value (I).

14. The method of claim 13, further comprising activating an alarm or carrying out a feed back operation on at least one torch based upon said extracted trends.

15. A system for remotely managing or controlling an electric arc welding shop in which at least one welding torch is utilized, each fed at least one consumable wire, each consumable wire moving with a wire speed (V) and subjected to an electrical current of intensity (I), which comprises:
   (a) a first determination means for each torch, comprising a speed sensor for determining at least one wire speed value (V) representative of the average speed at which each wire feeds each torch over a given period (T) and/or comprising at least one current sensor for determining at least one current intensity value (I) representative of the average current to which each wire is subjected over the given period (T);
   (b) a second determination means that cooperates with the first determination means in order to determine, from at least each speed value (V) of the wire or each intensity value (I) of the electrical current determined by the first determination means, at least one productivity parameter selected from the duty factor (DF) and the deposition rate (DR) for each torch of the shop and/or optionally the average value of these parameters for all the torches of the shop;
   (c) a remote transmission means which cooperates with a communicating network for remotely transmitting data to a central remote control device, wherein said data comprises at least one member selected from the group consisting of:
     1) said duty factor (DF);
     2) said deposition rate (DR);
     3) said wire speed value (V); and
     4) said current intensity value (I); and
   (d) a central remote control device for defining manufacturing profiles for categories of workpieces welded in the shop based on duly factor and deposition rate for the categories of workpieces depending on a generator used in the welding and organizing the profiles in the form of a library of models for use in scheduling work in the welding shop.

16. The system according to claim 15, wherein said system further comprises storing means for storing at least one selected from the group consisting of:
   (a) said duty factor (DF);
   (b) said deposition rate (DR);
   (c) said wire speed value (V); and
   (d) said current intensity (I).

17. The system according to claim 15, wherein said system further comprises:
   a) a means for acquiring and/or storing at least one wire speed value (V) determined by the speed sensor and/or at least one current intensity value (I) determined by the current sensor; and/or
   b) a means for processing the wire speed values (V) and/or the intensity values (I) before and/or after storage.

18. The system of claim 15, wherein said central remote control device extracts trends from said remotely transmitting data, wherein said data comprises at least one member selected from the group consisting of:
   a) said duty factor (DF);
   b) said deposition rate (DR);
   c) said wire speed value (V); and
   d) said current intensity value (I).

19. The system of claim 18, wherein said data processing unit comprises a central computing unit.

20. The system of claim 15, further comprising an acquisition means, wherein:
   a) said acquisition means is connected to said sensors by a connection means; and
   b) said connection means comprises at least one member selected from the group consisting of
     1) analog communication ports;
     2) digital communication ports; and
     3) acquisition paths.

21. The system of claim 15, wherein said acquisition means acquire, store, and/or process at least some of the value sent by said sensors, or by said data processing and storage facilities associated with said sensors.

* * * * *